United States Patent [19]
Yu

[11] Patent Number: 6,007,457
[45] Date of Patent: Dec. 28, 1999

[54] PRESSURE CONTROL FOR A 4-3 DOWNSHIFT AND A SHIFT FROM NEUTRAL

[75] Inventor: Pyung-hwan Yu, Kyungki-do, Rep. of Korea

[73] Assignee: Hyundai Motor Company, Seoul, Rep. of Korea

[21] Appl. No.: 09/212,604

[22] Filed: Dec. 16, 1998

[51] Int. Cl.[6] ................................................. F16H 61/08
[52] U.S. Cl. ........................... 477/149; 477/116; 477/117
[58] Field of Search ................................ 477/116, 117, 477/143, 149

[56] References Cited

U.S. PATENT DOCUMENTS

| | | | |
|---|---|---|---|
| 5,558,599 | 9/1996 | Tsukamoto et al. | 477/116 |
| 5,800,309 | 9/1998 | Takiguchi et al. | 477/149 X |
| 5,810,693 | 9/1998 | Nakayama et al. | 477/149 |
| 5,813,941 | 9/1998 | Jang | 477/116 |
| 5,842,951 | 12/1998 | Yasue et al. | 477/149 |
| 5,876,303 | 3/1999 | Yu | 477/116 |
| 5,887,483 | 3/1999 | Ohashi et al. | 477/116 X |
| 5,895,334 | 4/1999 | Yu | 477/116 |

Primary Examiner—Khoi Q. Ta

[57] ABSTRACT

A hydraulic control system for automatic transmissions includes a pressure control valve for regulating hydraulic pressure generated by a hydraulic pump to line pressure, a manual valve for converting the line pressure from the pressure control valve into drive pressure, a solenoid supply valve for reducing the line pressure from the pressure control valve, a torque control regulator valve controlled by the reduced pressure from the solenoid supply valve to convert the drive pressure from the manual valve into torque pressure that is lower than the drive pressure, and a shift valve for supplying the torque pressure from the torque control regulator valve to friction elements during an initial stage of a shift operation, then replacing the torque pressure with the drive pressure from the manual valve at an end of the shift operation. The hydraulic control system further includes a third speed friction element control clutch valve for supplying the torque pressure from the torque control regulator valve to a third speed friction element which is engaged in a third speed of a drive range at an initial 4-3 shifting operation, then replacing the torque converter fed to the third speed friction element with the line pressure from the pressure control valve at an end of the 4-3 shifting operation, whereby shift shock is reduced.

10 Claims, 8 Drawing Sheets

| Shift Range | | Operation of Friction Elements | | | | | | | Operation of Solenoid Valve | | | |
|---|---|---|---|---|---|---|---|---|---|---|---|---|
| | | C1 | C2 | C3 | B1 | B2 | B3 | B4 | S5 | S6 | S7 | S4 |
| D | 1 | ○ | | | ○ | | | | ON | ON | OFF | OFF |
| | 2 | ○ | | | ○ | ○ | | | OFF | ON | OFF | ON |
| | 3 | ○ | ○ | | ○ | ○ | | | OFF | OFF | OFF | OFF |
| | 4 | ○ | ○ | ○ | | ○ | | | OFF | OFF | ON | ON |
| R | | | ○ | | ○ | ○ | | | ON | ON | OFF | OFF |
| N,P | | | | | ○ | | | | ON | ON | OFF | OFF |
| 2 | | ○ | | | ○ | ○ | | ○ | OFF | ON | OFF | ON |
| L | | ○ | | | ○ | | ○ | | ON | ON | OFF | OFF |

FIG. 10

PRESSURE CONTROL FOR A 4-3 DOWNSHIFT AND A SHIFT FROM NEUTRAL

BACKGROUND OF THE INVENTION

1. Field of the Invention

The present invention relates to a hydraulic control system for automatic transmissions, and more particularly, to a hydraulic control system for automatic transmissions which can alleviate shift shock when shifting from a fourth speed to a third speed in a drive D range and when shifting from a neutral N range to a reverse R range.

2. Description of the Related Art

Conventional automatic transmissions used in vehicles include a torque converter, a multi-stage gear shift mechanism connected to the torque converter, and a plurality of friction members actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated in a hydraulic pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the hydraulic pump to each valve and actuator.

In such a hydraulic control system, to reduce shift shock, a low level of pressure is first fed to the friction elements, then the low level of pressure (hereinafter referred as "torque pressure") is replaced with a high level of pressure (hereinafter referred as "line pressure") when the friction elements start operating.

However, when shifting from the drive D range to the reverse R range, since a plurality of the friction elements are operated, increasing inertial force, shift shock is generated.

In addition, when shifting from a fourth speed to a third speed in the drive D range, since the line pressure is directed to the friction elements which are operated in the third speed, shift shock is generated.

SUMMARY OF THE INVENTION

The present invention has been made in an effort to solve the above problems.

It is an objective of the present invention to provide a hydraulic control system for automatic transmissions which reduces shift shock when shifting from a fourth speed to a third speed in the drive D range by supplying torque pressure to the friction elements during initial engagement of the same and then replacing the torque pressure with line pressure after the engagement.

To achieve the above objective, the present invention provides a hydraulic control system for automatic transmissions, which comprises a pressure control valve for regulating hydraulic pressure generated by a hydraulic pump to line pressure, a manual valve for converting the line pressure from the pressure control valve into drive pressure, a solenoid supply valve for reducing the line pressure from the pressure control valve, a torque control regulator valve controlled by the reduced pressure from the solenoid supply valve to convert the drive pressure from the manual valve into torque pressure that is lower than the drive pressure, and a shift valve for supplying the torque pressure from the torque control regulator valve to friction elements during an initial stage of a shift operation, then replacing the torque pressure with the drive pressure from the manual valve at an end of the shift operation, and a third speed friction element control clutch valve for supplying the torque pressure from the torque control regulator valve to a third speed friction element which is engaged in a third speed of a drive range at an initial 4-3 shifting operation, then replacing the torque converter fed to the third speed friction element with the line pressure from the pressure control valve at an end of the 4-3 shifting operation.

It is another objective of the present invention to provide a hydraulic control system for automatic transmissions which reduces shift shock by minimizing the number friction elements which is operated when shifting from a neutral N range to a reverse R range.

To achieve this objective, the hydraulic control system may further comprise an N-D control valve for supplying torque pressure from the torque control regulator valve to a drive range friction element which is engaged when shifting from a neutral range to the drive range at an initial N-D shifting operation, then replacing the torque pressure fed to the drive range friction element with the drive pressure from the manual valve.

According to an embodiment of the present invention, the solenoid supply valve comprises a first port through which the line pressure is fed from the pressure control valve, a second port selectively communicating with the first port to supply the reduced pressure to the torque control regulator valve, and a third port through which hydraulic pressure leaving through the second port is fed again to the body as control pressure.

Preferably, the solenoid supply valve may further comprise a valve spool having a first land on which the control pressure fed through the third port acts, a second land for selectively communicating the first port with the second port, and a third land on which biasing force of an elastic member is applied against the control pressure acting on the first land.

According to an embodiment of the present invention, the N-D control valve comprises a first port for receiving the line pressure from the pressure control valve, a second port for receiving the drive pressure from the manual valve, a third port selectively communicating with the second port to supply the drive pressure to at lease one drive range friction element, a fourth port connected to a branched line of from a line directed to the third port to receive hydraulic pressure leaving the third port as control pressure, a fifth port for receiving the torque pressure from the torque control regulator valve, and a sixth port selectively communicating with the fifth port to supply the torque pressure to the third speed friction element control clutch valve.

Preferably, the N-D control valve further comprises a valve spool having a first land on which the drive pressure fed through the first port acts to selectively communicate the second port with the third port, a second land for selectively communicating the third port with the fifth port, and a third land on which hydraulic pressure fed through the fourth port acts against the drive pressure acting on the first land to selectively communicate the fifth port with the sixth port.

According to still another embodiment of the present invention, the third speed friction element control clutch valve comprises a first port for receiving the line pressure from the pressure control valve, a second port selectively communicating with the first port to supply the line pressure to the third speed friction element, a third port for receiving the torque pressure from the torque control regulator valve, and a fourth port for receiving control pressure from the shift valve.

The third speed friction element control clutch valve further comprises a valve spool having a first land on which the control pressure fed through the fourth port acts to selectively communicate the first port with the second port, a second land 150 for selectively communicating the second port with the third port, and a third land on which biasing force of an elastic member acts against the control pressure acting on the first land.

According to yet another embodiment of the present invention, the N-D control valve comprises first and second ports connected to the pressure control valve 8 for receiving the line pressure, a third port for receiving the torque pressure from the torque control regulator valve, a fourth port for receiving the drive pressure from the manual valve, a fifth port for feeding hydraulic pressure coming through the first and fourth ports to the third speed friction element control clutch valve, a sixth port for supplying hydraulic pressure coming through the second port to another third speed friction element, a seventh port for feeding hydraulic pressure coming through the third port to the third speed friction element, and an eighth port connected to a bypass line connecting the seventh port to the fourth port.

The N-D control valve further comprises a valve spool having a first land on which the hydraulic pressure coming through the eighth port acts to selectively communicate the eighth port with the fourth port, a second land for selectively communicating the third port with one of the fifth and seventh ports, a third land for selectively communicating the fifth port with the first port, and fourth and fifth lands biased by an elastic member against the hydraulic pressure acting on the first land for selectively communicating the sixth port with one of the second port and an exhaust port.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
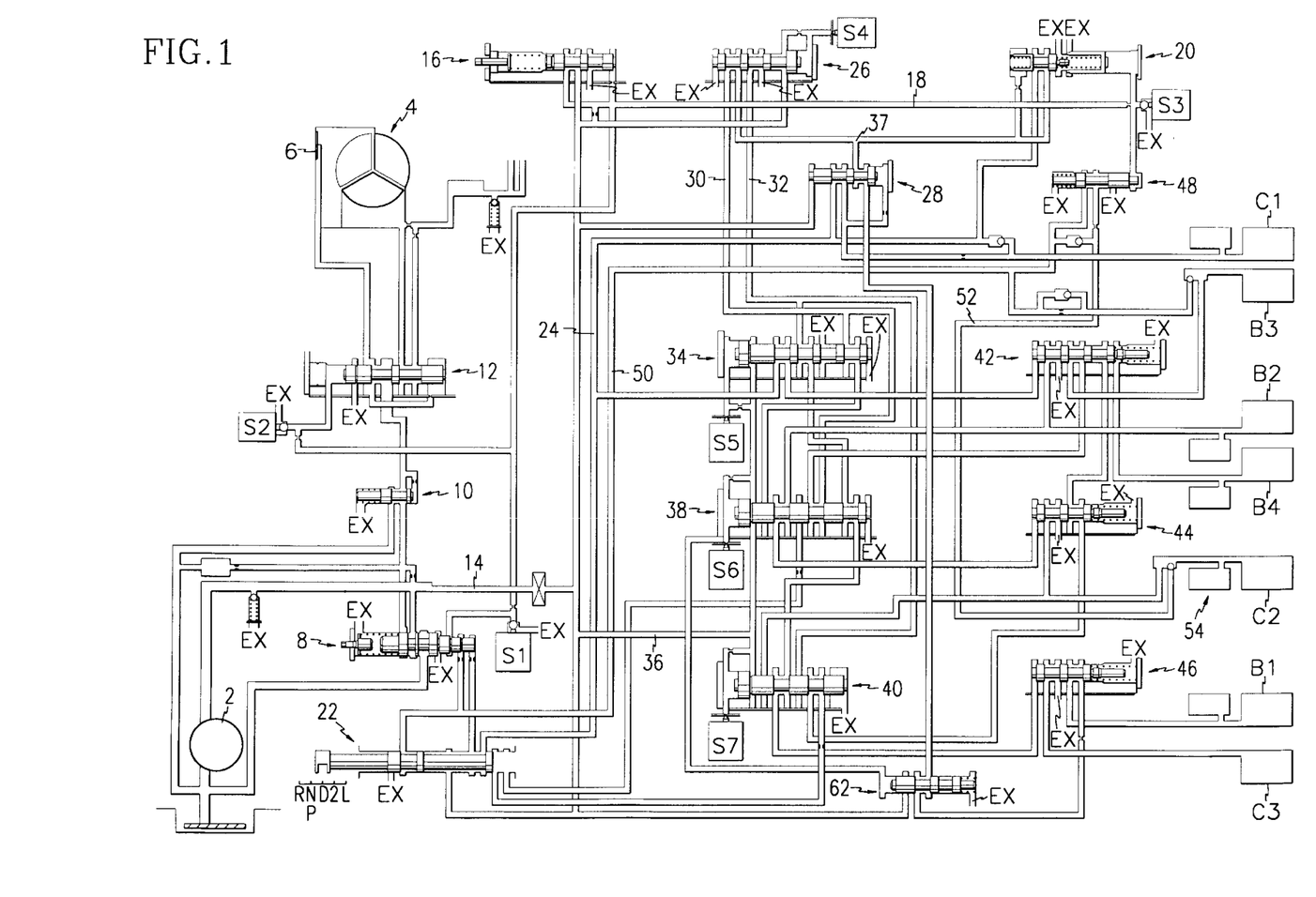
FIG. 1 is a hydraulic circuit diagram of a hydraulic control system for automatic transmissions according to a first preferred embodiment of the present invention.

FIG. 1 shows a hydraulic circuit diagram of a hydraulic control system for automatic transmissions according to a preferred embodiment of the present invention.

The hydraulic control system comprises a hydraulic pump 2 operated to create hydraulic pressure using driving force of an engine (not shown), a torque converter 4 for transmitting the driving force of the engine to an input shaft of a transmission, a damper clutch 6 disposed within the torque converter 4 to enhance power transmission efficiency, a pressure control valve 8 for converting hydraulic pressure into line pressure according to driving conditions of a vehicle, a converter feed valve 10 for feeding the line pressure from the pressure control valve 8 to the torque converter 4 and to other engine parts as lubricating fluid, and a converter clutch control valve 12 for controlling the operation of the damper clutch 6.

Port conversion of the pressure control valve 8 is controlled by a first solenoid valve S1, while port conversion of the converter clutch control valve 12 is controlled by a second solenoid valves S2. The first and second solenoid valves S1 and S2 are duty-controlled by a transmission control unit (TCU).

The pressure control valve 8 is connected to a solenoid supply valve 16 to supply line pressure thereto. The line pressure is reduced while passing through the solenoid supply valve 16, then supplied to the first and second solenoid valves S1 and S2 to act as control pressure for the pressure control valve 8 and the converter clutch valve 12. The solenoid supply valve 16 is connected to a torque control regulator valve 20 via a line 18 to supply the reduced pressure to the torque control regulator valve 20 as control pressure for the same. The control pressure in accordance with the operation of a third solenoid valve S3 controls Port conversion of the torque control regulator valve 20. The third solenoid valve S3 is controlled by the TCU.

A manual valve 22 is connected to the pressure control valve 8 to receive the line pressure. The manual valve 22 then converts the line pressure into drive pressure, port conversion of the manual valve 22 being realized by user operation of a shift select lever (not shown). The torque control regulator valve 20 is connected to the manual valve 22 via a line 24 to receive the drive pressure therefrom.

The torque control regulator valve 20 is designed to convert the drive pressure into torque pressure that is lower than the drive pressure in accordance with the operation of the third solenoid valve S3, then supplies the torque pressure to a control switch valve 26 and an N-D control valve 28 for alleviating shift shock generated when shifting from a neutral N range to a drive D range.

To reduce the shift shock, the N-D control valve 28 first supplies the torque pressure from the torque control regulator valve 20 to a second friction element C1 which is engaged together with a first friction element B1, at an initial N-D shifting operation, after which at the end of the N-D shifting operation the N-D control valve 28 undergoes port conversion to replace the torque pressure fed to the second friction element C1 with the drive pressure fed from the manual valve 22.

The control switch valve 26 is designed to selectively feed the torque pressure to a first torque pressure line 30 or a second torque pressure line 32 in accordance with the operation of a fourth solenoid valve S4 that is on-off controlled by the TCU.

The first torque pressure line 30 is connected to a 1-2 shift valve 34 and a 2-3 shift valve 38, while the second torque pressure line 32 is connected to the 1-2 shift valve 34 and a 3-4 shift valve 40. The 1-2 shift valve 34 undergoes port conversion in accordance with an on/off operation of a fifth solenoid valve S5 controlled by the TCU such that the drive pressure, fed from the manual valve 22 along the drive pressure line 24, is fed to a third friction element B2 when shifting from a first speed to a second speed in the drive D range. The 2-3 shift valve 38 undergoes port conversion in accordance with an on-off operation of a sixth solenoid valve S6 such that the drive pressure is fed from the manual valve 22 along a branch line 36 branched off from the line pressure line 14 to a fourth friction element C2 when shifting from a second speed to a third speed. The 3-4 shift valve 40 converts its ports according to an on-off operation of a seventh solenoid valve S7 such that the drive pressure is fed from the manual valve along the branch line 36 to a fifth friction element C3 when shifting from a third speed to a fourth speed.

All of the shift valves are designed to supply the torque pressure from the torque control regulator valve 20 to corresponding friction elements at the initial shifting operation, then replace the torque pressure fed to the friction elements with the drive pressure from the manual valve 22 at the end of the shifting operation.

The 2-3 shift valve 38 is designed to feed part of the hydraulic pressure directed toward to the third friction element B2 to the fourth friction element C2 to realize shifting into the third speed. The 3-4 shift valve 40 is designed to feed part of hydraulic pressure directed toward to the fourth friction element C2 to the fifth friction element C3 to realize into the fourth speed.

The 1-2 shift valve 34 is connected to a second clutch valve 42 to feed hydraulic pressure thereto in the second speed of the drive D range. The second clutch valve 42 is designed to feed hydraulic pressure received from the 1-2 shift valve 34 to both the third friction element B2 and the 2-3 shift valve 38. The second clutch valve 42 is connected to the 2-3 shift valve 38 and a third clutch valve 44 to feed hydraulic pressure received therefrom to sixth and seventh friction elements B3 and B4, respectively.

The third clutch valve 44 is designed to receive hydraulic pressure from the 2-3 shift valve 38 and supply the hydraulic pressure to the fourth friction element C2 and the 3-4 shift valve 40. In a second "2" range, the third clutch valve 44 is designed to further receive hydraulic pressure from the manual valve, then feed the same to the seventh friction element B4. The fourth clutch valve 46 is designed to receive hydraulic pressure from the 3-4 shift valve, then feeds the same to the fifth friction element C3.

In addition, the N-R control valve 48 which is controlled by the third solenoid valve S3 together with the torque control regulator valve 20 is connected to the manual valve 22 via a reverse pressure line 50 to supply hydraulic pressure from the manual valve 22 to the fourth friction element C2. An accumulator 54 is disposed on the line 50 to stabilize the hydraulic pressure passing therethrough.

As a feature of the first embodiment of the present invention, during a 4-3 shifting operation, the solenoid supply valve 16 is designed to first supply the torque pressure to the first friction element B1 during the initial stage of shifting. The torque pressure fed to the first friction element B1 is replaced with the drive pressure from the manual valve 22 at a point where the shifting operation is completed.

Figure 2:
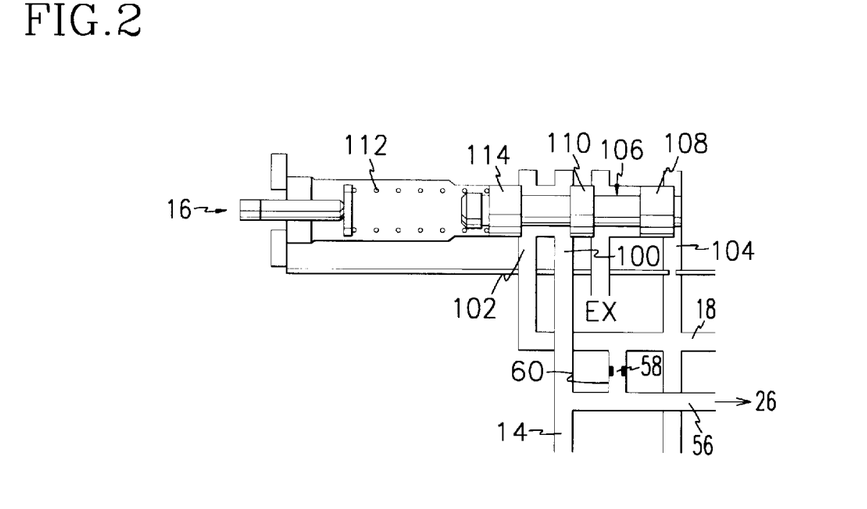
FIG. 2 is an enlarged view of a solenoid supply valve according to a first embodiment of the present invention.

To perform the above, as shown in FIG. 2, the solenoid supply valve 16 comprises a valve body provided with a first port 100 through which line pressure is fed from the pressure control valve 8, a second port 102 selectively communicating with the first port 100 to supply the line pressure to the torque control regulator valve 20 as control pressure, and a third port 104 through which the line pressure leaving through the second port 102 is fed again into the body as control pressure.

The solenoid supply valve 16 further comprises a valve spool 106 disposed within the valve body to realize port conversion of the solenoid supply valve 16. The valve spool 106 comprises a first land 108 on which the control pressure fed through the third port 104 acts, a second land 110 for communicating the first port 100 with the second port 102, and a third land 114 on which biasing force of an elastic member 112 disposed within the body is applied against the control pressure acting on the first land 108.

In addition, a line 56 branched off from the line pressure line 14 connected to the first port 100 to supply the line pressure to the solenoid valve 16 communicates with the control pressure line 18 extending from the second port 102 through a compensating line 60 in which an orifice 58 is mounted. As a result, since the control pressure supplied to the solenoid supply valve 16 to act on the first land 108 becomes higher than the biasing force of the elastic member 112 acting on the third land 114, shortage of an amount of fluid for forming supply pressure, which is caused by an overshooting of the valve spool 106, can be compensated for, thereby stabilizing the torque pressure.

In addition, as means for controlling the first friction element B1, a structure of the N-D control valve 28 is improved and a first friction element control clutch valve 62 is additionally added.

Figure 3:
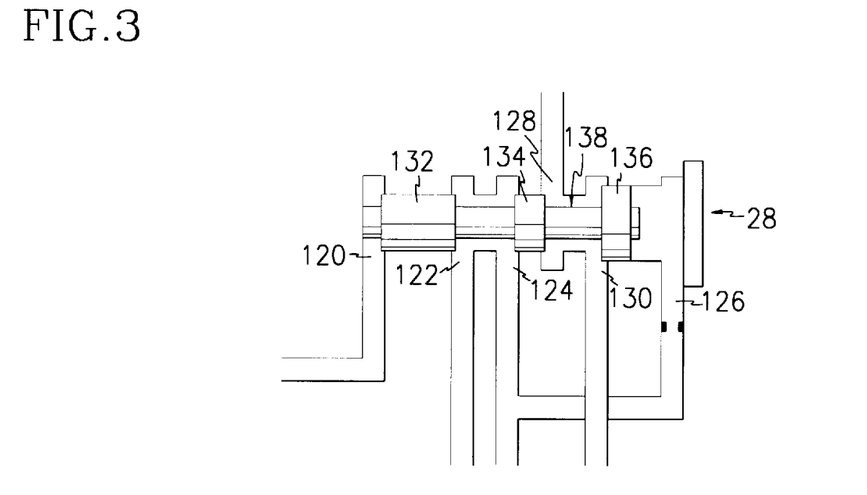
FIG. 3 is an enlarged view of an N-D control valve according to a first embodiment of the present invention.

Referring to FIG. 3, the N-D control valve 28 comprises a valve body provided with a first port 120 for receiving line pressure from the pressure control valve 8 as control pressure, a second port 122 for receiving the drive pressure from the manual valve 22, a third port 124 selectively communicating with the second port 122 to supply the drive pressure to the first friction element C1, a fourth port 126 connected to a branched line of a line directed to the third port 124 to receive hydraulic pressure from the branched line as control pressure, a fifth port 128 for receiving torque pressure from the torque control regulator valve 20, and a sixth port 130 selectively communicating with the fifth port 128 to supply the torque pressure to the first friction element control clutch valve 62.

The N-D control valve further comprises a valve spool 138 disposed within the valve body. The valve spool 138 comprises a first land 132 on which the control pressure fed through the first port 120 acts, a second land 467 for selectively communicating the second and third ports 122 and 124 and the third and fifth ports 124 and 128, and a third land 136 on which hydraulic pressure fed through the fourth port 126 acts to selectively communicate the fifth and sixth ports 128 and 130. That is, the sixth port 130 is additionally formed to supply torque pressure coming through the fifth port 128 to the first friction element control clutch valve 62 in a 4-3 shifting operation.

Figure 4:
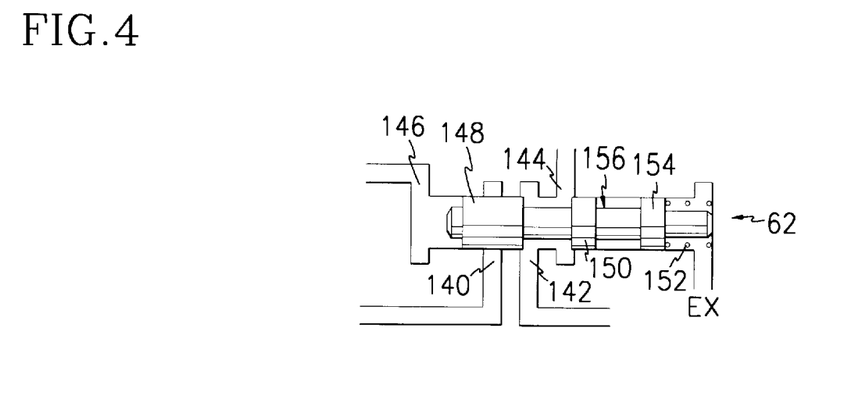
FIG. 4 is an enlarged view of a clutch valve for controlling a first friction element according to a first embodiment of the present invention.

FIG. 4 shows the first friction element control clutch valve 62 according to a first embodiment of the present invention.

The first friction element control clutch valve 62 comprises a valve body provided with a first port 140 for receiving the line pressure from the pressure control valve 8, a second port 142 selectively communicating with the first port 140 to supply the line pressure to the first friction element B1 via the fourth clutch valve 46, a third port 144 for receiving the torque pressure fed through the sixth port 130 of the N-D control valve 28, and a fourth port 146 for receiving control pressure from the 2-3 shift valve 39 according to the operation of the sixth solenoid valve S6 controlled by the TCU.

The first friction element control clutch valve 62 further comprises a valve spool 156 disposed within the valve body. The valve spool 156 comprises a first land 148 on which the line pressure fed through the fourth port 146 acts to selectively communicate the first port 140 with the second port 142, a second land 150 for selectively communicating the second port 142 with the third port 144, and a third land 154 on which biasing force of an elastic member 152 operates against the line pressure acting on the first land 148.

With this configuration, the first friction element control clutch valve 62 is designed to supply the torque pressure fed from the N-D control valve 28 and the line pressure fed from the pressure control valve 22 to the first friction element B1.

Figure 5:
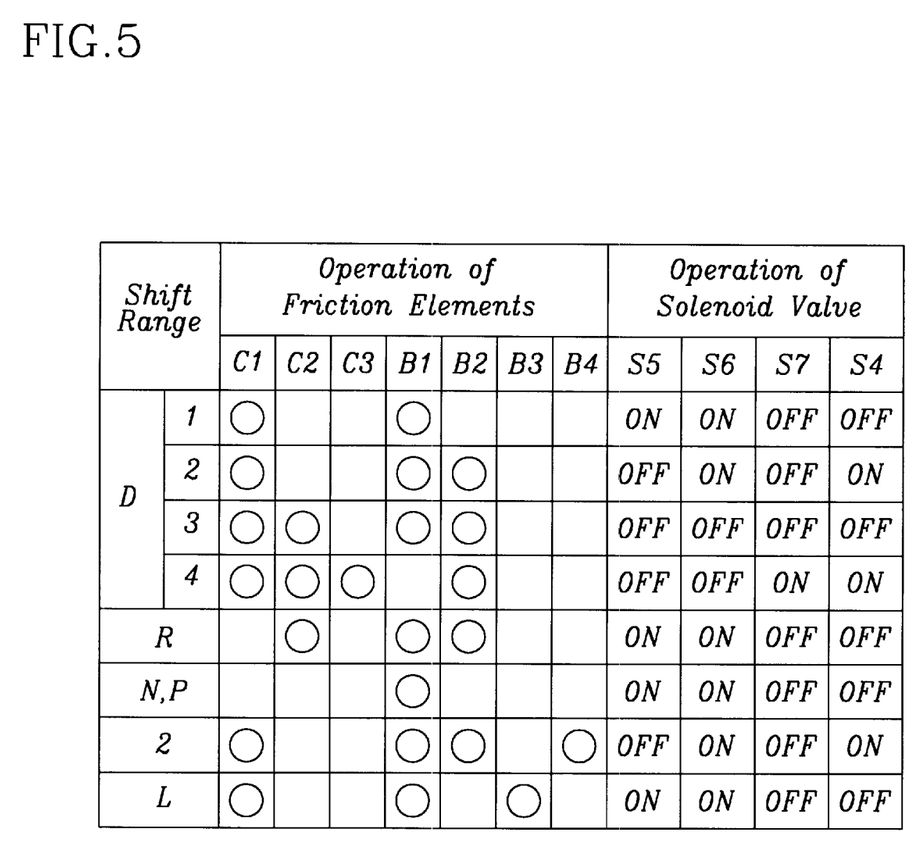
FIG. 5 is a chart illustrating operating states of solenoid valves and friction members in different driving modes according to a first preferred embodiment of the present invention.

In the hydraulic control system as structured above, the solenoid valves are operated as shown in FIG. 5. According to the operation of the solenoid valves, the friction elements are engaged or disengaged to realize automatic shifting. The description of shifting into the speed ranges except for an N-R shifting operation and a 4-3 shift operation will be omitted herein.

Figure 6:
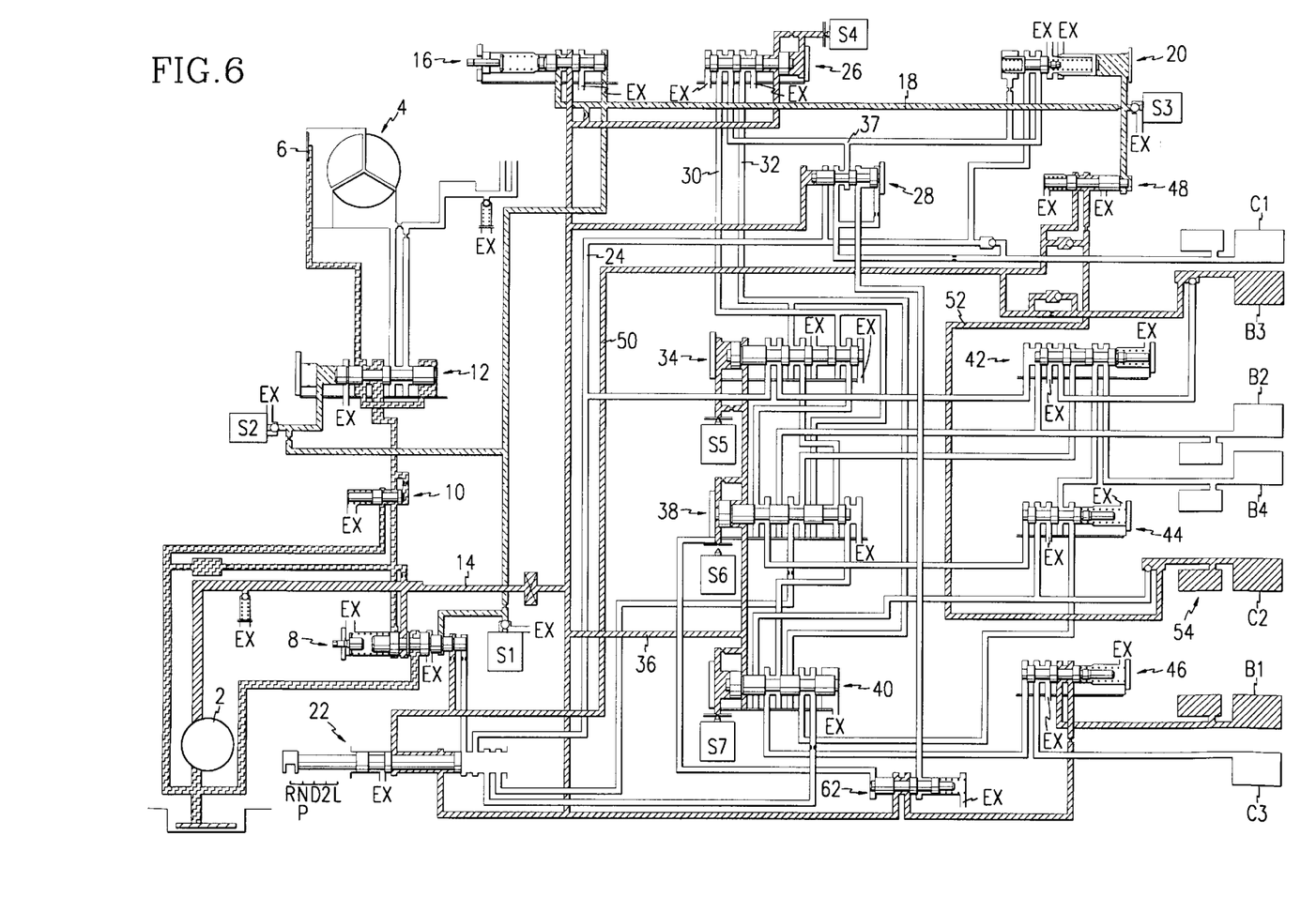
FIG. 6 is a hydraulic circuit diagram of the hydraulic control system shown in FIG. 1 in a state when shifting from a neutral N range to a reverse R range.

FIG. 6 shows a flow of hydraulic pressure in the hydraulic circuit when shifting from the N range to the R range.

In the N range, line pressure generated from the hydraulic pump 2 is directed to the first friction element B1 via the first friction element control clutch valve 62 and the fourth clutch valve 46. In this state, when the manual valve 22 is shifted from a neutral N range mode to a reverse R range mode, the line pressure is directed to the reverse pressure line 50. Part of the line pressure is then fed to the sixth friction element B3 and part of the line pressure is fed to the fourth friction element C2 via the N-R control valve 48. At this point, the accumulator 54 disposed on the line directed to the fourth friction element C2 alleviates shift shock.

Figure 7:
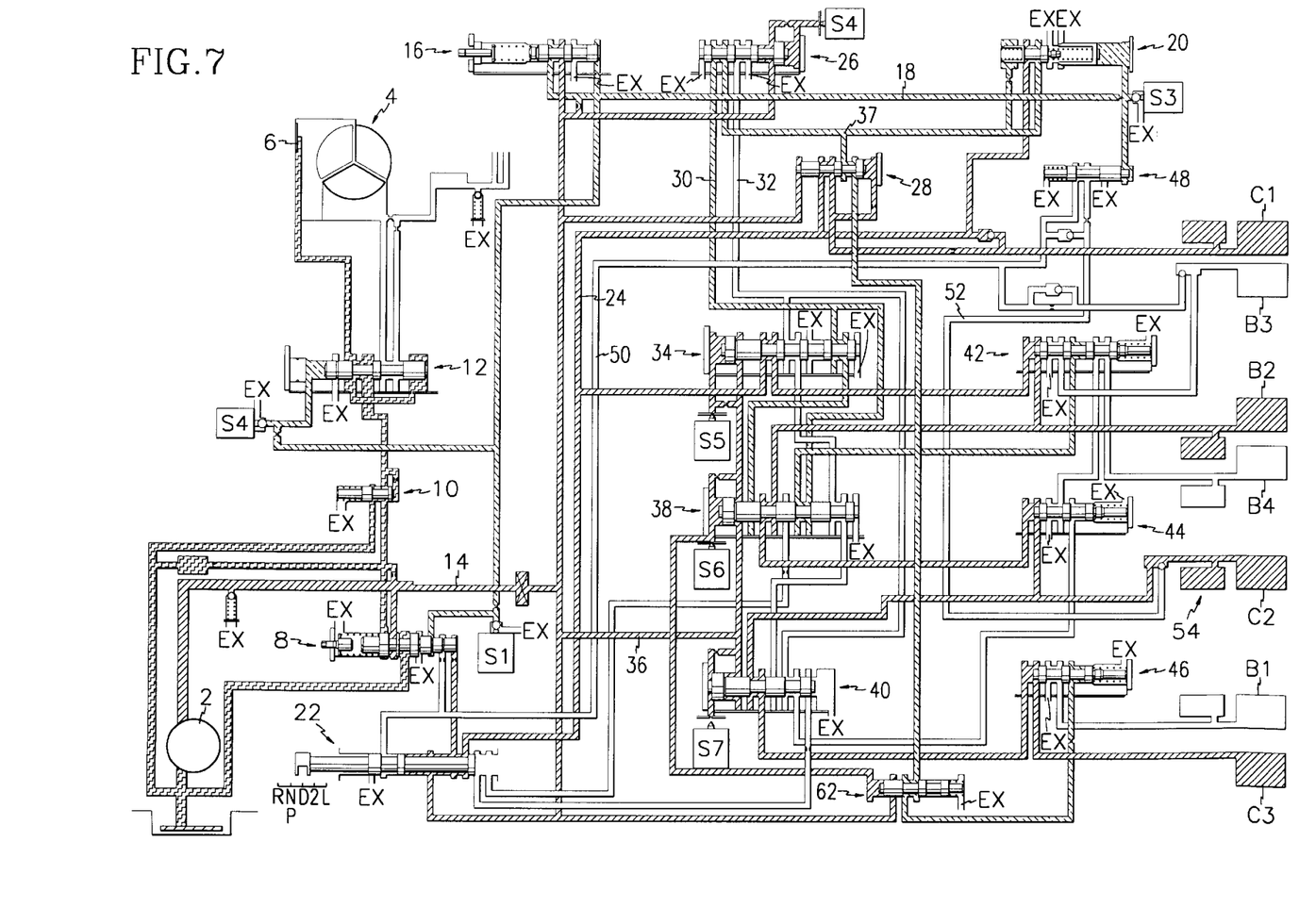
FIG. 7 is a hydraulic circuit diagram of the hydraulic control system shown in FIG. 1 in a state when shifting from a fourth speed to a third speed in a drive D range.

FIG. 7 shows a flow of hydraulic pressure in the hydraulic control system when shifting from a fourth speed to a third speed in the D range.

In the fourth speed state where the second, third, fourth and fifth friction elements C1, B2, C2 and C3 are engaged. If a third speed signal is outputted from the TCU according to a driving condition of the vehicle, the seventh solenoid valve S7 is controlled to an Off state to displace the valve spool of the 3-4 shift valve 40 such that the torque pressure is supplied to the first friction member B1.

In this state, when the third solenoid valve S3 is duty-controlled to an On state, the torque pressure formed through the torque control regulator valve 20 is converted into the drive pressure while the valve spool of the torque control regulator valve 20 is displace. As a result, the torque pressure applied to the first friction element B1 is replaced with the drive pressure that is higher than the torque pressure, completing the shifting to the third speed.

Figure 8:
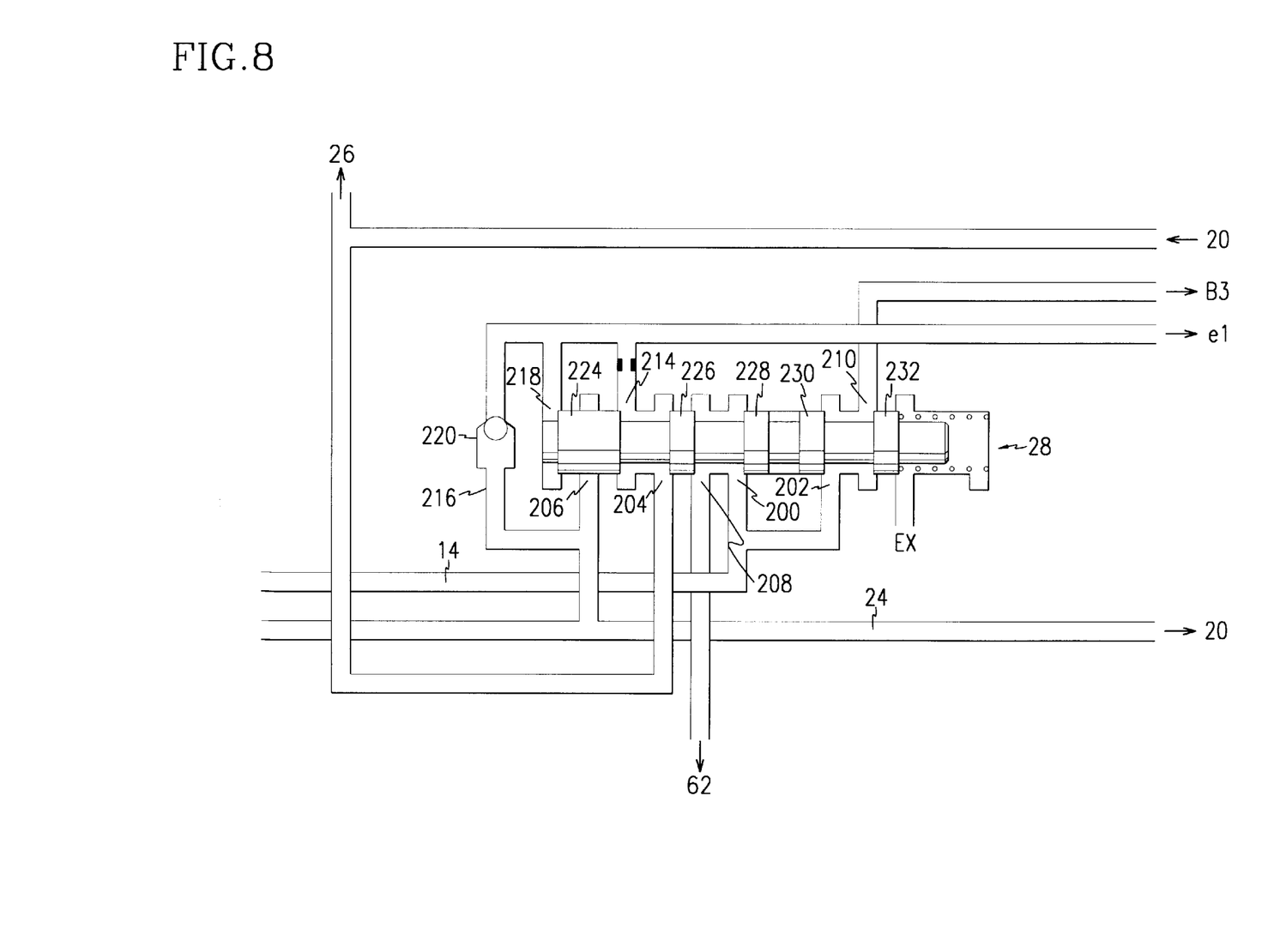
FIG. 8 is an enlarged view of an N-D control valve according to a second embodiment of the present invention.

FIG. 8 shows an N-D control valve according to a second embodiment of the present invention.

The N-D control valve 28 comprises a valve body provided with first and second ports 200 and 202 connected to the line pressure line 14, a third port 204 for receiving torque pressure from the torque control regulator valve 20, a fourth port for receiving drive pressure from the manual valve 22, a fifth port 208 for feeding hydraulic pressure coming through the first and fourth ports 200 and 206 to the first friction element control clutch valve 62, a sixth port 210 for supplying hydraulic pressure coming through the second port 202 to the sixth friction element B3, a seventh port 214 for feeding hydraulic pressure coming through the third port 204 to the first friction element B1, and an eighth port 218 connected to a bypass line 216 connecting the seventh port 214 to the fourth port 206. A check valve 220 is disposed on the bypass line 216.

The N-D control valve 28 further comprises a valve spool 222 disposed within the valve body. The valve spool 222 comprises a first land 224 on which the hydraulic pressure coming through the eighth port 218 acts to selectively communicate the eighth port 218 with the fourth port 206, a second land 226 for selectively communicating the third port 204 with one of the fifth and seventh ports 208 and 214, a third land 228 for selectively communicating the fifth port 208 with the first port 200, and fourth and fifth lands 230 and 232 for selectively communicating the second port 202 with the sixth port 210 and the sixth port 210 and an exhaust port Ex. An elastic member 101 biases the fifth land 232 against the hydraulic pressure acting on the first land 224.

Accordingly, the first and second ports 200 and 202 receive line pressure, the third port 204 receives torque pressure, and the fourth port 206 receives drive pressure. These pressures are selectively supplied to the first, sixth and seventh friction elements B1, B3 and B4. The fifth port 208 selectively supplies the line pressure and the torque pressure received respectively through the first and third ports 200 and 204 to the first friction element B1 in the N, D and R ranges.

In addition, the sixth port 210 supplies the line pressure coming through the second port 202 to the sixth friction element B3 in the R range, and the seventh port 214 supplies the torque pressure coming through the third port 204 to the second friction member C1 during an initial stage of the shifting operation. The check valve 220 mounted within the bypass line 216 prevents the drive pressure from being directly directed toward the eighth port 218.

Figure 9:
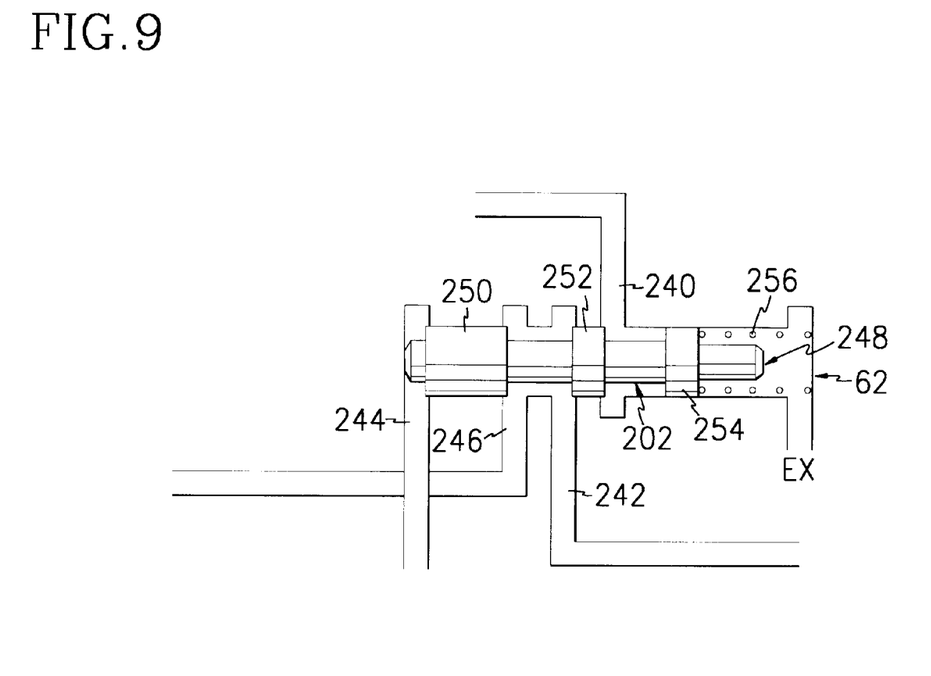
FIG. 9 is an enlarged view of a clutch valve for controlling a first friction element according to a first embodiment of the present invention.

FIG. 9 shows a first friction element control clutch valve according to a second embodiment of the present invention.

The first friction element control clutch valve 62 for directing hydraulic pressure from the N-D control valve 28 to the first friction element B1 comprises a valve body provided with a first port 240 for receiving hydraulic pressure from the N-D control valve 28, a second port 242 for supplying the hydraulic pressure coming through the first port 240 to the first friction element B1 via the fourth clutch valve 46, a third port 244 for receiving control pressure of the sixth solenoid valve S6, and a fourth port 246 for receiving line pressure.

The first friction element control clutch valve 62 further comprises a valve spool 248 disposed within the valve body. The valve spool 248 comprises a first land 250 on which control pressure coming through the third port 244 acts, a second land 252 for selectively communicating the second port 242 with one of the first and fourth ports 240 and 246, and a third land 256 biased by an elastic member 254 against the control pressure acting on the first land 250 to selectively intercommunicating the first and second ports 240 and 242.

Accordingly, during an initial stage of the shifting operation, the torque pressure coming through the first port 240 is directed to the first friction element, and when the shift operation is completed, the torque pressure is replaced with the drive pressure.

Figure 10:
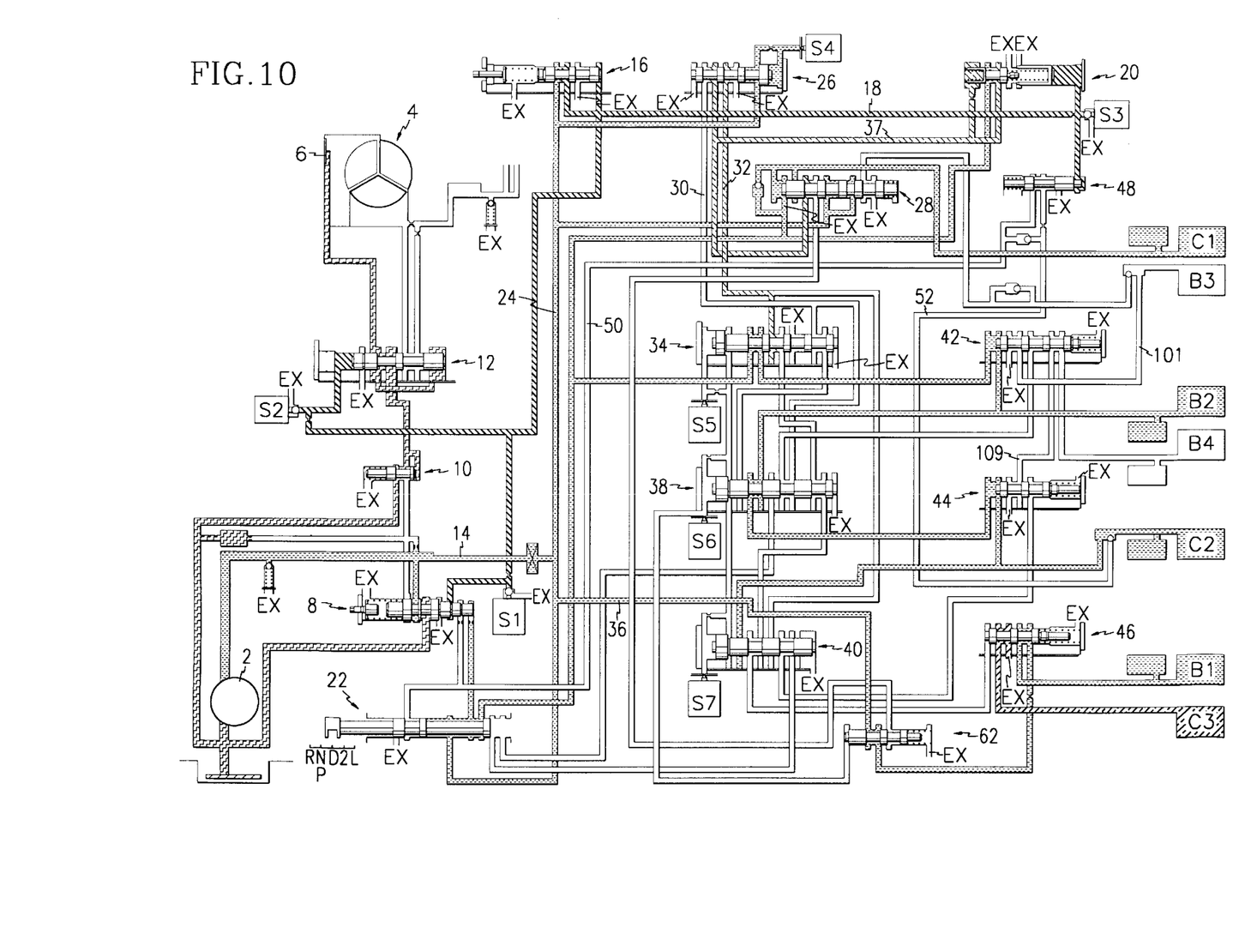
FIG. 10 is a hydraulic circuit diagram of a hydraulic control system for automatic transmissions in a neutral N range according to a second preferred embodiment of the present invention.

FIG. 10 shows a hydraulic control system where the N-D control valve 28 and the first friction element control clutch valve 62 according to the second embodiment of the present invention are employed.

As the operation of the hydraulic control system at each shift range is the same as that of the first embodiment of the present invention, the description thereof will be omitted herein.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for automatic transmissions comprising:

a pressure control valve for regulating hydraulic pressure generated by a hydraulic pump to line pressure;

a manual valve for converting the line pressure from the pressure control valve into drive pressure;

a solenoid supply valve for reducing the line pressure from the pressure control valve;

a torque control regulator valve controlled by the reduced pressure from the solenoid supply valve to convert the drive pressure from the manual valve into torque pressure that is lower than the drive pressure; and a shift valve for supplying the torque pressure from the torque control regulator valve to friction elements during an initial stage of a shift operation, then replacing the torque pressure with the drive pressure from the manual valve at an end of the shift operation, wherein the hydraulic control system further comprises a third speed friction element control clutch valve for supplying the torque pressure from the torque control regulator valve to a third speed friction element which is engaged in a third speed of a drive range at an initial 4-3 shifting operation, then replacing the torque converter fed to the third speed friction element with the line pressure from the pressure control valve at an end of the 4-3 shifting operation, whereby shift shock is reduced.

2. The hydraulic control system of claim 1 further comprising an N-D control valve for supplying torque pressure from the torque control regulator valve to a drive range friction element which is engaged when shifting from a neutral range to the drive range at an initial N-D shifting operation, then replacing the torque pressure fed to the drive range friction element with the drive pressure from the manual valve.

3. The hydraulic control system of claim 1 wherein the solenoid supply valve comprises a first port through which the line pressure is fed from the pressure control valve, a second port selectively communicating with the first port to supply the reduced pressure to the torque control regulator valve, and a third port through which hydraulic pressure leaving through the second port is fed again to the body as control pressure.

4. The hydraulic control system of claim 3 wherein the solenoid supply valve further comprises a valve spool having a first land on which the control pressure fed through the third port acts, a second land for selectively communicating the first port with the second port, and a third land on which biasing force of an elastic member is applied against the control pressure acting on the first land.

5. The hydraulic control system of claim 1 wherein the N-D control valve comprises a first port for receiving the line pressure from the pressure control valve, a second port for receiving the drive pressure from the manual valve, a third port selectively communicating with the second port to supply the drive pressure to at lease one drive range friction element, a fourth port connected to a branched line of from a line directed to the third port to receive hydraulic pressure leaving the third port as control pressure, a fifth port for receiving the torque pressure from the torque control regulator valve, and a sixth port selectively communicating with the fifth port to supply the torque pressure to the third speed friction element control clutch valve.

6. The hydraulic control system of claim 5 wherein the N-D control valve further comprises a valve spool having a first land on which the drive pressure fed through the first port acts to selectively communicate the second port with the third port, a second land for selectively communicating the third port with the fifth port, and a third land on which hydraulic pressure fed through the fourth port acts against the drive pressure acting on the first land to selectively communicate the fifth port with the sixth port.

7. The hydraulic control system of claim 1 wherein the third speed friction element control clutch valve comprises a first port for receiving the line pressure from the pressure control valve, a second port selectively communicating with the first port to supply the line pressure to the third speed friction element, a third port for receiving the torque pressure from the torque control regulator valve, and a fourth port for receiving control pressure from the shift valve.

8. The hydraulic control system of claim 7 wherein the third speed friction element control clutch valve further comprises a valve spool having a first land on which the control pressure fed through the fourth port acts to selectively communicate the first port with the second port, a second land 150 for selectively communicating the second port with the third port, and a third land on which biasing force of an elastic member acts against the control pressure acting on the first land.

9. The hydraulic control system of claim 2 wherein the N-D control valve comprises first and second ports connected to the pressure control valve 8 for receiving the line pressure, a third port for receiving the torque pressure from the torque control regulator valve, a fourth port for receiving the drive pressure from the manual valve, a fifth port for feeding hydraulic pressure coming through the first and fourth ports to the third speed friction element control clutch valve, a sixth port for supplying hydraulic pressure coming through the second port to another third speed friction element, a seventh port for feeding hydraulic pressure coming through the third port to the third speed friction element, and an eighth port connected to a bypass line connecting the seventh port to the fourth port.

10. The hydraulic control system of claim 9 wherein the N-D control valve further comprises a valve spool having a first land on which the hydraulic pressure coming through the eighth port acts to selectively communicate the eighth port with the fourth port, a second land for selectively communicating the third port with one of the fifth and seventh ports, a third land for selectively communicating the fifth port with the first port, and fourth and fifth lands biased by an elastic member against the hydraulic pressure acting on the first land for selectively communicating the sixth port with one of the second port and an exhaust port.

* * * * *